United States Patent

Lipasti et al.

(10) Patent No.: US 9,952,870 B2
(45) Date of Patent: Apr. 24, 2018

(54) APPARATUS AND METHOD FOR BIAS-FREE BRANCH PREDICTION

(71) Applicant: Wisconsin Alumni Research Foundation, Madison, WI (US)

(72) Inventors: Mikko Lipasti, Lake Mills, WI (US); Dibakar Gope, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 273 days.

(21) Appl. No.: 14/303,932

(22) Filed: Jun. 13, 2014

(65) Prior Publication Data

US 2015/0363203 A1    Dec. 17, 2015

(51) Int. Cl.
*G06F 9/38* (2006.01)

(52) U.S. Cl.
CPC .......... *G06F 9/3806* (2013.01); *G06F 9/3844* (2013.01); *G06F 9/3848* (2013.01)

(58) Field of Classification Search
CPC ..... G06F 9/3806; G06F 9/3844; G06F 9/3848
See application file for complete search history.

(56) References Cited

U.S. PATENT DOCUMENTS

| 5,454,117 A * | 9/1995 | Puziol .................. G06F 9/3806 712/23 |
| 5,758,142 A * | 5/1998 | McFarling ............ G06F 9/3848 712/233 |
| 6,189,091 B1 * | 2/2001 | Col ........................ G06F 9/3842 712/228 |
| 6,502,188 B1 * | 12/2002 | Zuraski, Jr. ........... G06F 9/3806 711/125 |
| 6,550,004 B1 * | 4/2003 | Henry ................... G06F 9/3848 712/236 |
| 7,055,023 B2 * | 5/2006 | Tago ..................... G06F 9/3848 712/240 |
| 2001/0032309 A1 * | 10/2001 | Henry ................... G06F 9/3848 712/239 |
| 2002/0194465 A1 * | 12/2002 | Sinharoy ............... G06F 9/3844 712/239 |
| 2004/0003218 A1 * | 1/2004 | Ukai ..................... G06F 9/3848 712/240 |

(Continued)

OTHER PUBLICATIONS

Daniel A. Jiménez, "An Optimized Scaled Neural Branch Predictor," 2011 IEEE 29th Int'l Conference on Computer Design (ICCD), Oct. 2011, pp. 113-118.*

(Continued)

*Primary Examiner* — Yuqing Xiao
(74) *Attorney, Agent, or Firm* — Boyle Fredrickson, SC (57) ABSTRACT

An apparatus and method for filtering biased conditional branches in a branch predictor in favor of non-biased conditional branches are disclosed. Biased conditional branches, which are consistently skewed toward one direction or outcome, are filtered such that an increased number of non-biased conditional branches which resolve in both directions may be considered. As a result, more useful branches may be captured over larger distances, thereby providing correlations deeper in a global history. In addition, by tracking only the latest occurrences of non-biased conditional branches using a recency stack structure, even more distant branch correlations may be made.

16 Claims, 3 Drawing Sheets

(56) References Cited

U.S. PATENT DOCUMENTS

| | | | |
|---|---|---|---|
| 2004/0210749 A1* | 10/2004 | Biles | G06F 9/3848 712/240 |
| 2005/0149707 A1* | 7/2005 | Jourdan | G06F 9/3848 712/239 |
| 2005/0204120 A1* | 9/2005 | Prasky | G06F 9/325 712/238 |
| 2006/0149951 A1* | 7/2006 | Abernathy | G06F 9/3806 712/240 |
| 2010/0332812 A1 | 12/2010 | Burger et al. | |
| 2011/0087866 A1 | 4/2011 | Shah et al. | |
| 2012/0124344 A1* | 5/2012 | Jarvis | G06F 9/3806 712/230 |

OTHER PUBLICATIONS

Gabriel H. Loh & Daniel A. Jiménez, "Reducing the Power and Complexity of Path-Based Neural Branch Prediction," Proceedings of the 5th Workshop on Complexity Effective Design (WCED), 2005, pp. 1-8.*

André Seznec, "A new case for the TAGE branch predictor," 2011, Proceedings of the 44th Annual IEEE/ACM Int'l Symposium on Microarchitecture, pp. 117-127.*

André Seznec, "Design tradeoffs for the alpha EV8 conditional branch predictor," 2002, Proceedings. 29th Annual Int'l Symposium on Computer Architecture, pp. 295-306.*

Jiménez et al., "Dynamic Branch Prediction with Perceptrons," 7th Int'l Symposium on High Performance Computer Architecture, Jan. 2001, pp. 197-206.*

Seznec, "A 256 Kbits L-TAGE branch predictor," Journal of Instruction-Level Parallelism (JILP) Special Issue: The 2nd Championship Branch Prediction Competition (CBP-2), vol. 9, May 2007, pp. 1-6.*

Jimenez et al.; Neural Methods for Dynamic Branch Prediction; ACM Transactions on Computer Systems; Nov. 2002; pp. 369-397; vol. 20; No. 4, New York, NY; USA.

* cited by examiner

APPARATUS AND METHOD FOR BIAS-FREE BRANCH PREDICTION

STATEMENT REGARDING FEDERALLY SPONSORED RESEARCH

This invention was made with government support under 1318298 and 1116450 awarded by the National Science Foundation. The government has certain rights in the invention.

BACKGROUND OF THE INVENTION

The present invention relates to computer processors, and more particularly, to branch predictors for computer processors.

In computer architecture, a branch predictor is a digital circuit that attempts to determine which direction a conditional branch may follow in an instruction stream. Branching is usually implemented with a conditional jump instruction, and once encountered, a branch may be "taken" or "not taken." If taken, the instruction flow may continue in a first direction, and if "not taken," the instruction flow may continue in a second direction. One example of a conditional branch is an "if-then-else" structure used in computer programming.

High-performance processors, which tend to be deeply pipelined, typically rely on branch predictors to continuously supply the core with instructions. Branch predictors essentially improve the flow of instructions in the pipeline to keep the pipeline full and maintain performance. Without branch prediction, the processor would have to wait until the conditional jump instruction has passed the execute stage before the next instruction could enter the pipeline. Branch predictors attempt to avoid this delay by predicting whether the conditional jump is most likely to be taken or not taken.

Research around a class of predictors referred to as neurally-inspired perceptron branch predictors has shown certain improvements in prediction accuracy by exploiting correlations in long branch histories. However, systems with moderate hardware budgets, such as on the order of 32 to 64 KB, typically restrict such predictors from correlating beyond 32 to 64 branches in a dynamic execution stream. As some correlations may only become evident over larger distances, such as on the order of 512 to 1024 branches apart, such predictors are consequently limited in their prediction ability.

Some attempts at correlating branches over larger distances have included increasing the branch prediction hardware budget, such as to 1 MB, in an effort to track more branches. However, such larger data structures undesirably result in increased access latencies and increased power consumption. Also, such larger data structures undesirably cause increased training times for the neural-based perceptron predictors.

A need therefore exists to provide a branch predictor with increased performance that eliminates one or more of the foregoing disadvantages.

SUMMARY OF THE INVENTION

The inventors have recognized that "biased" conditional branches, or branch instructions that are consistently skewed toward one direction or outcome, serve little correlation benefit for predicting the direction or outcome of "non-biased" conditional branches. "Non-biased" branches resolve in both directions, whereas branches that display only one behavior during the execution of a program may be considered "biased" branches. Biased conditional branches merely reinforce a prediction decision already established by correlation with a non-biased branch in the global history. As such, biased conditional branches may be filtered from limited hardware resources available to a branch predictor in favor of non-biased conditional branches such that more non-biased conditional branches may be captured over larger separation distances. Accordingly, effective correlations may be established much deeper in the global history to provide greater prediction accuracy.

The inventors have also recognized that by tracking only the latest occurrence of a "non-biased" conditional branches, even more distant branch correlations, such as of the order of 2000 branches deep, can be made. Consequently, prediction accuracy can be further improved with increased optimization.

In accordance with an embodiment of the invention, an apparatus for branch prediction may comprise a branch history buffer for capturing a plurality of conditional branches provided by an instruction stream; a biased branch filter for distinguishing between biased conditional branches and non-biased conditional branches and permitting only the non-biased conditional branches to be included in the branch history buffer, wherein non-biased conditional branches follow a first branch direction in a first instance during execution of the instruction stream and follow a second branch direction in a second instance during execution of the instruction stream; and a correlation element for correlating between non-biased conditional branches captured in the branch history buffer to predict a direction for the pending conditional branch.

A duplicate branch filter may also be included for detecting a second non-biased conditional branch that is a duplicate of a first non-biased conditional branch held in the branch history buffer and causing the first non-biased conditional branch to be evicted from the branch history buffer in favor of the second non-biased conditional branch.

It is thus a feature of at least one embodiment of the invention to capture even more distant branch correlations and further improve prediction accuracy by only tracking the most recent occurrence of a non-biased conditional branch.

Including a non-biased conditional branch in the branch history buffer may result in a least-recently-seen non-biased conditional branch to be evicted from the branch history buffer.

It is thus a feature of at least one embodiment of the invention to introduce simple changes to the branch predictor's circuit to minimize perturbations induced by the occurrences of newly detected non-biased branches in the branch history buffer at runtime.

The biased branch filter may be configured to maintain a branch status table for tracking conditional branches as being at least one of a biased conditional branch and a non-biased conditional branch.

It is thus a feature of at least one embodiment of the invention to provide a data structure for tracking and quickly referencing the states of encountered branches.

The correlation element may implement a neural-based perceptron predictor, and the branch history buffer may include some recent conditional branches regardless of their biased or non-biased states to address perceptron predictor artifacts during initial training phase.

It is thus a feature of at least one embodiment of the invention to provide a branch prediction unit that improves upon learning-based predictors and minimizes the impact of initial training time.

These particular objects and advantages may apply to only some embodiments falling within the claims, and thus do not define the scope of the invention.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENT

Figure 1:
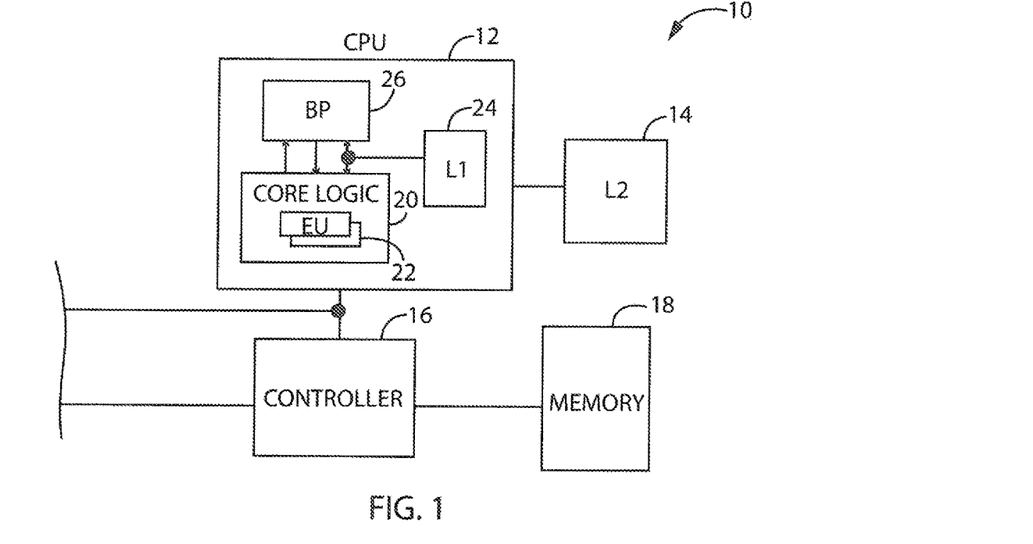
FIG. 1 is a simplified block diagram of a computer processor and system in accordance with an embodiment of the invention.

Retelling now to FIG. 1, an embodiment of the present invention will be described in the exemplar context of a computer system 10 and a processor 12. The processor 12 may be one of many processors in the computer system 10 and may include various interfaces and buses for communicating with external components, such as a cache 14, a memory controller 16 and a main memory 18. The processor 12 includes core logic 20 providing a plurality of execution units 22, which may be deeply pipelined, wide-issue execution units in a preferred embodiment. The processor 12 may also include a local cache 24 containing an instruction stream for processing and execution by the core logic 20 and the execution units 22. The instruction stream may be provided by hierarchical storage elements, including the cache 14 and the main memory 18 as directed by the memory controller 16, to achieve maximal performance as understood in the art.

The processor 12 further includes a branch prediction unit 26 in communication with the core logic 20. The branch prediction unit 26 may consider conditional branch instructions during execution flow, such as a conditional jump instruction assembled from an "if-then-else" structure, and process to determine directional outcomes for the conditional branches. Accordingly, the branch prediction unit 26 may operate to steer instructions to the core logic 20 and the execution units 22 corresponding to the predicted directional outcome to continuously supply the core with instructions and minimize processing delays.

In a preferred embodiment, the branch prediction unit 26 may implement a neurally-inspired perceptron predictor providing "neural branch prediction," although any suitable type of branch predictor may be employed. A perceptron is a learning device that takes a set of input values and combines them with a set of weights learned through training to produce an output value. Each weight represents the degree of correlation between the behavior of a past branch and the behavior of the branch being predicted. Positive weights may represent positive correlation and negative weights may represent negative correlation. To make a prediction, each weight may contribute in proportion to its magnitude in the following manner. If its corresponding branch was taken, the weight may be added; otherwise the weight may be subtracted. If the resulting sum is positive, the branch may be predicted as "taken;" otherwise, the branch may be predicted as "not taken." The branch history may use "1" to represent taken and "−1" to represent not taken. The perceptrons may be trained according to a learning rule that increments a weight when the branch outcome agrees with the behavior of a past branch and decrements the weight otherwise.

In various embodiments, the branch prediction unit 26 may implement various control and data structures, such as history registers that track prior branch history, weight tables that reflect relative weights or strengths of predictions, and/or target data structures that store addresses that are predicted to be targets. Accordingly, the branch prediction unit 26 may exploit long histories with, essentially linear resource growth.

Also, it will be appreciated that the branch prediction unit 26, though preferably implemented in a processor, may be implemented in other structures in which branch prediction may be desirable, including for example, microcontrollers, programmable logic, and so forth.

Figure 2:
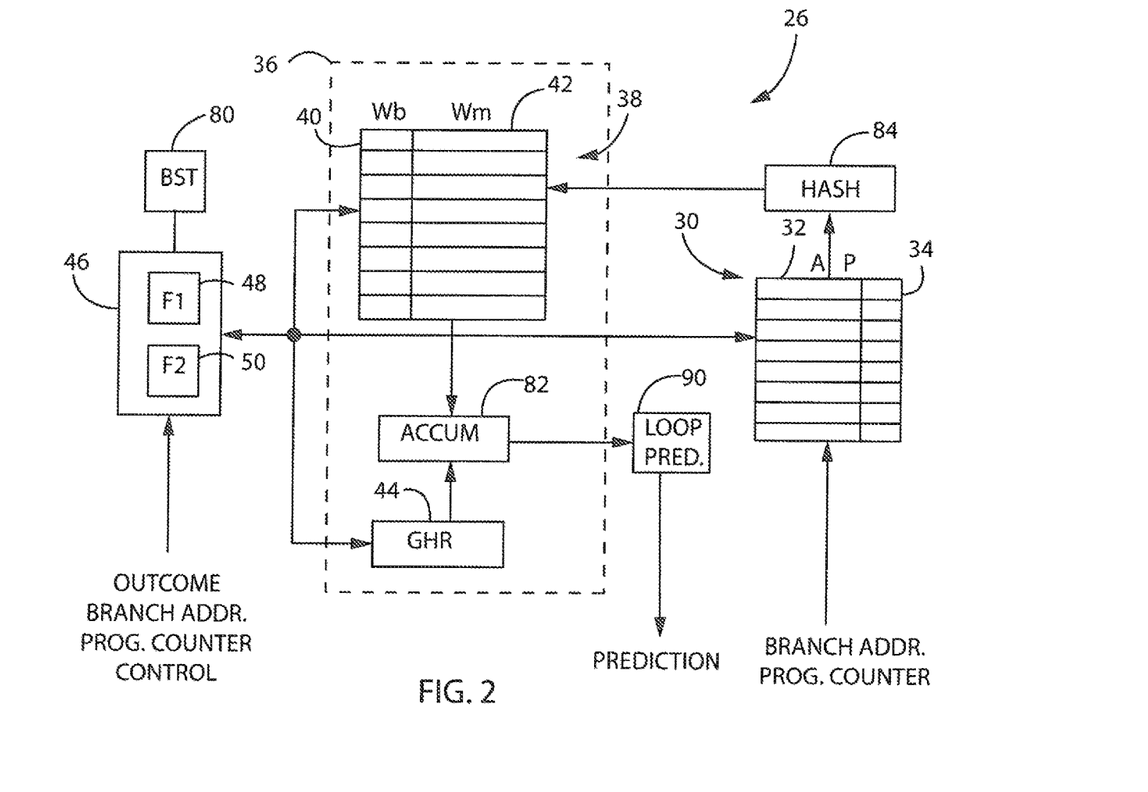
FIG. 2 is a simplified block diagram of a branch prediction unit in accordance with an embodiment of the invention.

Referring now to FIG. 2, a simplified block diagram of the branch prediction unit 26 is provided in accordance with an embodiment of the invention. A branch history buffer 30 captures a plurality of conditional branches provided by an instruction stream. The branch history buffer 30 may comprise an address array ("A") 32 and a position array ("P") 34. The address array 32 provides addresses for past executed non-biased conditional branches. If a non-biased conditional branch is executed, the branch's address is shifted into the first position of the address array 32. The address array 32 is not updated with respect to biased branches. The position array 34 provides the absolute distance in the past global history for corresponding non-biased branches captured in the address array 32. Similarly, the position array 34 is not updated with respect to biased brandies.

A correlation element 36 provides correlation between non-biased conditional branches held in the branch history buffer 30 to predict branch directions for pending conditional branches. The correlation element 36 may comprise a weight table 38 that includes a bias weight array ("$W_b$") 40 and a correlating weight array ("$W_m$") 42 having "i" rows. In a preferred embodiment, the bias weight array 40 may be a one-dimensional integer array for providing 6-bit bias weights, and the correlating weight array 42 may be a two-dimensional integer array providing 6-bit perceptron correlating weights.

In addition, a global history register ("GHR") 44 is maintained for providing a number of history bits ("h") for tracking non-biased conditional branch outcomes, such as "1" for a taken branch or "0" for a not-taken branch, to thereby facilitate non-biased branch correlations. The GHR 44 only accumulates outcomes of non-biased branches as they are executed. The GE-JR 44 may be a shift register in which branch outcomes are shifted into the first position.

A logic element 46 may implement a biased branch filter ("F1") 48 and/or a duplicate branch filter ("F2") 50. The biased branch filter 48 may operate to distinguish between biased conditional branches and non-biased conditional branches provided by an instruction stream when enabled or applied. Accordingly, the biased branch filter 48 may permit only non-biased conditional branches to be considered by the aforementioned elements of the branch prediction unit 26 for the pending conditional branch.

Figure 3:
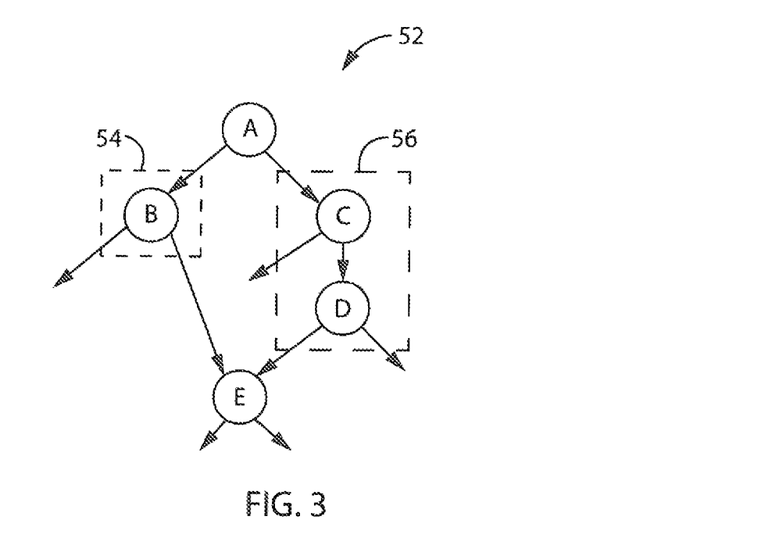
FIG. 3 is a simplified block diagram of a control flow graph in accordance with an embodiment of the invention.

By way of example, referring briefly to FIG. 3, an instruction stream 52 may provide conditional branches "A," "B," "C," "D" and "E," with each branch having two possible directions based on outcomes, one representing "taken" and another representing "not-taken," Branch A may result in either a first direction 54, which includes branch B, or a second direction 56, which includes branches D and E. However, whether branch A follows the first direction 54 or the second direction 56, branch A will lead to branch E, which may be a pending branch for prediction. Branch E may be predicted as "taken" or "not-taken" depending on whether the first direction 54 or the second direction 56, both from branch A, was followed (the path history). However, branch E may produce the opposite outcome depending on whether the execution path, or path history, leading to branch E from branch A follows the first direction 54 or the second direction 56.

As such, branch A may be considered a non-biased conditional branch in that branch A may follow either of two directions, and branches B, C and D may be considered biased conditional branches which are consistently skewed toward one direction during a program execution. Since biased branches B or C and D execute only on one of the program paths to branch E, the weights associated with branches B or C and D along the two path histories may develop strong correlations to influence the prediction decision of branch E. However, it is the non-biased branch A that steers the control flow through either branch B or branches C and D that subsequently leads up to the branch E. Accordingly, the biased branch filter 48 may permit only branch A to be included in the branch history buffer 30 for the pending branch E. The correlations associated with branch B or branches C and D merely reinforce the prediction decision of branch £ that can independently be established by correlating only with non-biased branch A.

Figure 4:
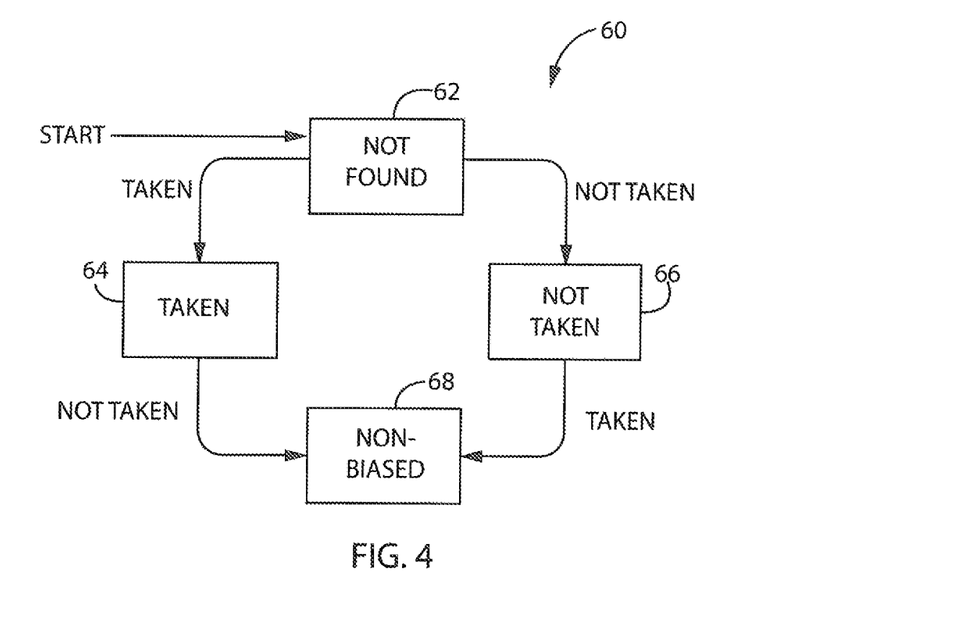
FIG. 4 is a simplified block diagram of a finite state machine for a branch prediction apparatus in accordance with an embodiment of the invention.

Referring briefly to FIG. 4, the biased branch filter 48 may implement a finite state machine 60 to distinguish between biased conditional branches and non-biased conditional branches in accordance with an embodiment of the invention. Until a branch is encountered for the first time, the finite state machine 60 relating to a conditional branch may stay in a "Not found" state 62. When a prediction is to be made for a conditional branch detected in the "Not found" state 62, aggregated correlations from the perceptrons need not be considered. However, when this conditional branch is committed for the first time, the finite state machine 60 transitions from the "Not found" state 62 to the "Taken" state 64 or the "Not taken" state 66, depending on the outcome of the branch. The "Taken" and "Not taken" states 64 and 66 essentially exist to record the "bias" direction of previously unknown branches and to predict the future instances of those branches.

In the event a branch that is in the "Taken" state 64 or the "Not taken" state 66 subsequently executes in the opposite direction that differs from the recorded state, the finite state machine 60 transitions to the "Non-biased" state 68. Then, any future instances of this branch may be predicted using aggregated correlations according to the branch prediction unit 26. In other words, branches begin by being considered biased, and after the system determines a conditional branch to be non-biased, the system includes the conditional branch in the branch history buffer 30 to develop correlations of this branch with other non-biased branches.

Turning back to FIG. 2, the biased branch filter 48 may maintain a branch status table ("BST") 80 for recording the statuses of a branch by the finite state machine 60 according to the aforementioned states. In essence, the branch status table 80 may serve as a direct-mapped data structure that records and identifies information relating to the past behaviors of conditional branches.

Taken together, the GHR 44, the address array 32 and the position array 34 provide the path history for a current branch to be predicted. An accumulator ("accum") 82 provides an integer dot product of the weights vector chosen and the GHR 44.

Below is an exemplar prediction flow for the branch prediction unit 26 in accordance with an embodiment of the invention:

```
function prediction (pc: integer) : { taken, not_taken }
if pc is biased branch then
    prediction ← bias_direction
else
    accum ← W_b [pc mod n]
    for i ←1 .. h do in parallel
        row_index ← hash (pc xor A[i] xor P[i]) mod n
        accum ← accum + W_m [row_index, i] * GHR [i]
    end for
    if accum ≥ 0 then
        prediction ← taken
    else
        prediction ← not_taken
    end if
end if
```

For each non-biased branch captured in the address array 32, a prediction flow hash function 84 hashes the branch address, the address of the non-biased branch in the address array 32 and the branch's absolute distance in history recorded in the position array 34, to select a row in the weight table 38 and map to a column in the correlating weight array 42. That is, for every non-biased branch of every path, the prediction unit 26 may track the correlation of that branch in conjunction with its recorded absolute distance in the history. Correlations computed in this way for each component of the current path are then aggregated to make a prediction according to the dot product computation. A mixed analog/digital implementation may be used to perform the dot-product computation with decreased latency and power.

As branches are committed, the weights used to predict a non-biased branch are updated. This may provide, for example, perceptron training/learning if a prediction is incorrect, or if the sum used to make a prediction has a magnitude less than a training threshold, then each weight may be adjusted. Correlating weights may be incremented if the outcome of the current branch is the same as the outcome of the corresponding branch in the address array 32. Otherwise, correlating weights may be decremented. Also, the bias weight may be incremented if the current branch was taken or decremented if the current branch was not taken. Weights are not updated if a biased branch commits. However, when a non-biased branch commits, the GHR 44, the address array 32 and the position array 34 are updated, such as with the branch's outcome, the program counter and/or distance in the history.

The duplicate branch filter 50 may operate to detect conditional branches, which could selectively be biased conditional branches and/or non-biased conditional branches, that are duplicative of branches in the branch history buffer 30. For example, with respect to non-biased conditional branches, when a non-biased conditional branch is encountered that is a duplicate of a non-biased conditional branch included in the branch history buffer 30, the duplicate branch filter 50 may operate to evict the older non-biased conditional branch as used in the branch prediction unit 26 in favor of the more recent non-biased conditional branch. This essentially minimizes the footprint of a single non-biased conditional branch in the path history of a branch, and thus, in turn, assists in including any highly correlated branch from deeper in the global history within a modest length global history register. In other words, tracking multiple instances of a non-biased conditional branch is avoided to permit tracking more total non-biased conditional branches overall.

In operation, for an embodiment with respect to non-biased branches, when a non-biased branch is committed, the address array 32 and the position array 34 are scanned to find the last occurrence of that branch. If an entry with the last occurrence of the branch is found, it is evicted from the address array 32, the position array 34 and the GHR 44. The set of locations from the first position to the matching entry in the GHR 44, the address array 32 and the position array 34 are shifted by one and adjusted accordingly to fill the evicted slot. The current occurrence of the non-biased branch, with the branch's direction and absolute distance in the history, is shifted into the first position of the GHR 44, the address array 32 and the position array 34.

Figure 5:
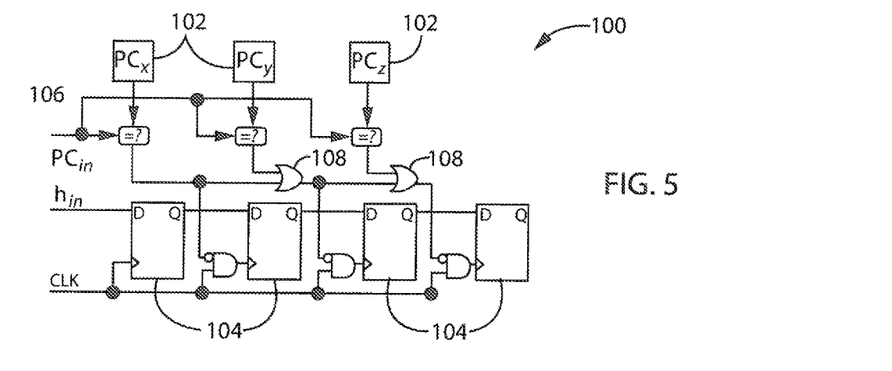
FIG. 5 is a simplified schematic of a recency stack in accordance with an embodiment of the invention.

The duplicate branch filter 50 may maintain a recency-stack-like structure to retain the most recent occurrence of a conditional branch, which could selectively be a biased conditional branches or a non-biased branch, in the branch history buffer 30. Referring now to FIG. 5, a simplified schematic of a 4-entry recency-stack-structure 100 is provided in accordance with an embodiment of the invention. $PC_x$, $PC_y$ and $PC_z$ indicate the program counters ("PC") 102 of the three most recent branches present in the recency stack 100. En operation, when a non-biased branch $PC_{in}$ 106 is committed, the recency stack 100 is scanned to find the last occurrence of that branch. If the branch $PC_{in}$ 106 hits in the recency stack, then it is moved to the top of the recency stack and updated with its recent outcome. The set of locations from the first position in the recency stack to the hitting entry are shifted by one position. The associated OR gate 108 of the hitting entry guarantees that downstream flip-flops to be clock are gated. This results in downstream flip-flops to retain the most recent outcome of other non-biased branches. In case of no entry is found with $PC_{in}$ 106, the recency stack structure 100 acts like a conventional shift register. The storage elements 104 may have a length corresponding to the number of history bits "h." As such, the GHR 44 in conjunction with the address array 32 and the position array 34 essentially may operate as a recency stack 100.

Referring again to FIG. 2, the absolute distance captured in the position array 34 essentially may assist to learn different correlations for different instances of a branch with the recent occurrence of a non-biased branch present in the recency stack 100. As used herein, absolute distance refers to the distance of a non-biased conditional branch in the branch history from the current pending conditional branch to be predicted.

In a preferred embodiment, the correlating weight array 42 may be configured as a one-dimensional integer array having "p" entries. Configuring the correlating weight array 42 as a one-dimensional array essentially reduces perturbations induced by the occurrences of newly detected non-biased branches in the branch history buffer 30. This, in turn, assists previously detected non-biased branches in avoiding re-learning of correlations in a different depth of the branch history buffer 30. For each non-biased branch captured in the address array 32, a prediction flow hash function 84 may hash the branch address, the address of the non-biased branch in the address array 32 and the branch's absolute distance in history recorded in the position array 34 to select an entry in the one-dimensional correlating weight array 42.

The biased branch filter 48 may also be configured to enable or apply after an initial plurality of consecutive conditional branches are included in the branch history buffer without regard to biased or non-biased states. As such, the prediction unit 26 may accumulate a stream of branches and build correlations using an unfiltered history with the advantage of expediting start up conditions and initial learning. The prediction unit 26 may be configured to include few recent conditional branches in the branch history buffer without regard to their biased or non-biased states. This essentially assists non-biased conditional branches captured in the branch history buffer to avoid mis-predictions during the initial learning phase.

In order to further improve accuracy and reduce aliasing with respect to perceptron entries in the weight table 38, for each non-biased branch captured in the address array 32, the hash function 84, to index the perceptron counters in the weight table 38, may also include global history bits from the non-biased branch leading to the pending branch to be predicted. If the number of global history bits exceeds the number of bits used in the predictor index function, the global history bits may be "folded" using a bit-wise XOR of groups of consecutive history bits, and hashed down to the required number of bits for the predictor index. Such history folding is implemented by taking advantage of the fact that instead of folding a random value, a global history value derived from the previous history value is folded.)

A loop predictor 90 may also be implemented in the branch prediction unit 26 to identify regular loops with a constant number of iterations, and provide the global prediction to the core logic 20 when a loop has successively been executed a certain number of times, e.g., 7, with the same number of iterations. Otherwise, the loop predictor 90 may simply forward the output of the accumulator 82 in providing the global prediction.

The branch prediction unit 26 may be compact in size and scale larger as technology for the processor 12 allows. For example, the branch prediction unit 26 may be sized small enough, for example, to limit tracking to no more than 64 conditional branches, while still capturing distant branch correlations (of the order of 2000 branches deep). In other words, the branch prediction unit may be advantageously sized to provide a tracked-branch to branch-separation-distance ratio of at least 8 and up to 32.

Figure 6:
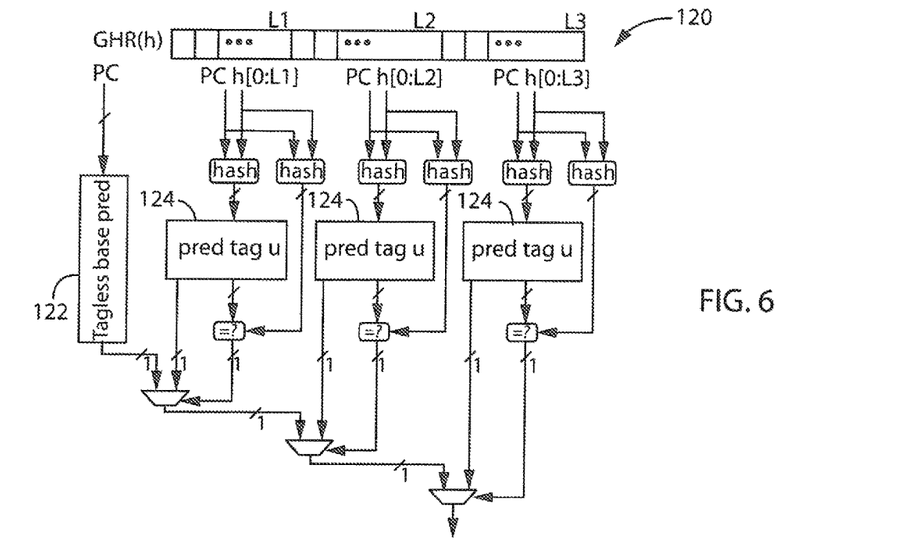
FIG. 6 is a simplified schematic of a multi-stage prediction system which may implement an embodiment of the invention.

Referring now to FIG. 6, a simplified schematic of a multi-stage prediction system is provided which may implement an embodiment of the invention. An exemplar four component tagged geometric length ("TAGE") predictor 120 may include a base predictor 122, for providing a basic prediction, backed by several tagged predictor components 124 indexed using increasingly more history bits. Predictor selection may be performed through a tree of multiplexors. Accordingly, the tagged predictor components 124 may implement aspects of the branch prediction unit 26 in accordance with embodiments of the invention. For example, in one embodiment, the tagged predictor components 124 may each implement aspects of the branch prediction unit 26 with successively increasing numbers of history bits in each. Permitting only the non-biased conditional branches to be included in the branch history buffer 120, in conjunction with the recency-stack-like management policy, may realize a TAGE-style predictor to boost accuracy with same number of tables or achieve similar accuracy with fewer tables. In a preferred embodiment employing a TAGE-style predictor, the branch history buffer may be configured to hold no more than 150-180 conditional branches. Other embodiments may provide more or fewer stages, or implement alternative architectures or styles, without departing from the spirit of the invention.

Figure 7:
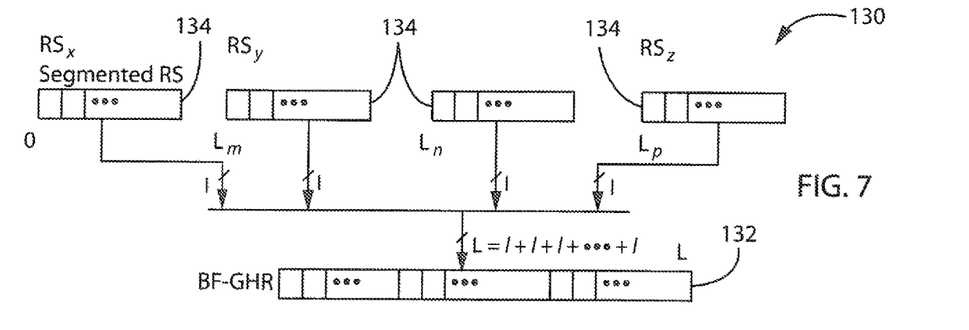
FIG. 7 is a simplified schematic illustrating bias-free history generation for the multi-stage prediction system of FIG. 6.

FIG. 7 provides a simplified schematic illustrating a bias-free history generation system 130 for the multi-stage prediction system of FIG. 6. Here, the long global history 132 may essentially be divided into non-overlapping segments, each of which may be handled by smaller recency stacks 134. At prediction time the per-segment recency stacks 134, in increasing depth of histories act together as the branch history buffer. The sizes of the non-overlapping segments form a geometric series. Each of the segmented recency stacks 134 includes only a single instance of a non-biased branch from the corresponding history segment. For example, the recency stack $RS_y$ may capture the recent instance of non-biased branches from the segment that covers past global histories from depth of $L_m$ to $L_n$. The size of the per-segment recency stacks 134 ($RS_x, RS_y, \ldots, RS_z$) is much smaller than the history segments that they cover, resulting in capturing long global histories (on the order of 2000 branches) in about 150-200 bits of the bias-free global history register (BF-GHR).

It will be appreciated that while some embodiments of the invention have been described in the context of conditional jump instructions, if-then-else structures and two-way branching, more complex instructions, programming structures and multi-way branching may be similarly provided without departing from the spirit of the invention. The invention offers distinct advantages in numerous computing environments, including with respect to multi-processor systems and multi-core processors.

It is specifically intended that the present invention not be limited to the embodiments and illustrations contained herein, but include modified forms of those embodiments including portions of the embodiments and combinations of elements of different embodiments as come within the scope of the following claims.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor" can be understood to include one or more microprocessors that can communicate in a standalone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

We claim:

1. An apparatus for branch prediction comprising:
a branch history buffer for capturing addresses of non-biased conditional branches provided by an instruction stream and positions of the non-biased conditional branches during execution of the instruction stream;
a biased branch filter distinguishing between biased conditional branches and non-biased conditional branches and selectively blocking the distinguished biased conditional branches from being included in the branch history buffer, wherein biased conditional branches are consistently skewed toward one direction during execution of the instruction stream and non-biased conditional branches resolve in either direction during execution of the instruction stream; and
a circuit correlating earlier non-biased conditional branches captured in the branch history buffer to pending non-biased conditional branches and not correlating earlier distinguished biased conditional branches that are not captured in the branch history buffer to pending non-biased conditional branches, the circuit comprising:
a weight table including a plurality of weights corresponding to weights for only the non-biased conditional branches captured in the branch history buffer; and
a global history register accumulating branch directions for only the non-biased conditional branches captured in the branch history buffer during execution of the instruction stream,
wherein the circuit makes a prediction for a pending non-biased conditional branch according to weights and branch directions based on the earlier non-biased conditional branches and not on the earlier distinguished biased conditional branches, and
further comprising a duplicate branch filter for detecting a second non-biased conditional branch that is a duplicate of a first non-biased conditional branch held in the branch history buffer and causing the first non-biased conditional branch to be evicted from the branch history buffer in favor of the second non-biased conditional branch, wherein the detecting comprises scanning an address array and a position array to find a last occurrence of the second non-biased conditional branch.

2. The apparatus of claim 1, wherein the apparatus is implemented in at least one stage of a tagged geometric length (TAGE) predictor.

3. The apparatus of claim 2, further comprising a plurality of recency stacks, wherein each recency stack captures instances of non-biased conditional branches corresponding to a segment of global history.

4. The apparatus of claim 2, wherein the branch history buffer is configured to hold no more than 180 conditional branches.

5. The apparatus of claim 1, wherein the biased branch filter is configured to maintain a branch status table for tracking conditional branches as being at least one of a biased conditional branch and a non-biased conditional branch.

6. The apparatus of claim 1, wherein the biased branch filter is configured to apply after an initial plurality of consecutive branches are included in the branch history buffer.

7. The apparatus of claim 1, wherein the branch history buffer is configured to hold no more than 64 conditional branches.

8. The apparatus of claim 1, wherein the branch history buffer is configured to include non-biased conditional branches that are at least 512 conditional branches apart in the instruction stream.

9. The apparatus of claim 1, wherein, for each non-biased conditional branch captured in the branch history buffer, a hash function is operable to map the non-biased conditional branch to a correlating perceptron weight.

10. The apparatus of claim 1, wherein the circuit includes a one-dimensional bias weight array.

11. The apparatus of claim 1, wherein the biased branch filter includes a state machine distinguishing between biased conditional branches and non-biased conditional branches, wherein the state machine indicates a first state for a conditional branch when the conditional branch is executed a first time in a first direction, then the state machine indicates a second state for the conditional branch when the conditional branch is executed a second time in a second direction, wherein only the second state indicates a non-biased conditional branch.

12. The apparatus of claim 1, wherein the circuit makes the prediction by computing an integer dot product of the weights and the global history register.

13. An apparatus for branch prediction comprising:
a branch history buffer for capturing addresses of non-biased conditional branches provided by an instruction stream and positions of the non-biased conditional branches during execution of the instruction stream;
a biased branch filter distinguishing between biased conditional branches and non-biased conditional branches and selectively blocking the distinguished biased conditional branches from being included in the branch history buffer, wherein biased conditional branches are consistently skewed toward one direction during execution of the instruction stream and non-biased conditional branches resolve in either direction during execution of the instruction;
a duplicate branch filter detecting a second non-biased conditional branch that is a recent duplicate of a first non-biased conditional branch held in the branch history buffer, and causing the first non-biased conditional branch to be evicted from the branch history buffer in favor of the second non-biased conditional branch, wherein the detecting comprises scanning an address array and a position array to find a last occurrence of the second non-biased conditional branch; and
a circuit correlating earlier non-biased conditional branches captured in the branch history buffer to pending non-biased conditional branches and not correlating earlier distinguished biased conditional branches not captured in the branch history buffer to pending non-biased conditional branches, the circuit comprising:
a weight table including a plurality of weights corresponding to weights for only the non-biased conditional branches captured in the branch history buffer; and
a global history register accumulating branch directions for only the non-biased conditional branches captured in the branch history buffer during execution of the instruction stream,
wherein the circuit makes a prediction for a pending conditional branch according to weights and branch directions on the earlier non-biased conditional branches and not on the earlier distinguished biased conditional branches.

14. The apparatus of claim 13, further comprising maintaining a branch status table for tracking conditional branches as being at least one of a biased conditional branch and a non-biased conditional branch.

15. The apparatus of claim 13, wherein the apparatus is implemented in at least one stage of a tagged geometric length (TAGE) predictor.

16. A computer processor comprising:
a cache for holding an instruction stream;
an execution unit for executing instructions from the instruction stream; and
a branch prediction unit for steering the instructions to the execution unit, wherein the branch prediction unit comprises:
(a) a branch history buffer for capturing addresses of non-biased conditional branches provided by the instruction stream and positions of the non-biased conditional branches during execution of the instruction stream;
(b) a biased branch filter distinguishing between biased conditional branches and non-biased conditional branches and selectively blocking the distinguished biased conditional branches from being included in the branch history buffer, wherein biased conditional branches are consistently skewed toward one direction during execution of the instruction stream and non-biased conditional branches resolve in either direction during execution of the instruction stream;
(c) a circuit correlating earlier non-biased conditional branches captured in the branch history buffer to pending non-biased conditional branches, not correlating earlier distinguished biased conditional branches that are not captured in the branch history buffer to pending non-biased conditional branches and steering instructions to the execution unit corresponding to predicted branch directions, the circuit comprising:
a weight table including a plurality of weights corresponding to weights for only the non-biased conditional branches captured in the branch history buffer; and
a global history register accumulating branch directions for only the non-biased conditional branches captured in the branch history buffer during execution of the instruction stream,
wherein the circuit makes a prediction for a pending non-biased conditional branch according to weights and branch directions based on the earlier non-biased conditional branches and not on the earlier distinguished biased conditional branches; and
(d) a duplicate branch filter for detecting a second non-biased conditional branch that is a duplicate of a first non-biased conditional branch held in the branch history buffer and causing the first non-biased conditional branch to be evicted from the branch history buffer in favor of the second non-biased conditional branch, wherein the detecting comprises scanning an address array and a position array to find a last occurrence of the second non-biased conditional branch.

* * * * *